United States Patent
Longo et al.

(10) Patent No.: US 7,829,618 B2
(45) Date of Patent: Nov. 9, 2010

(54) POWDER THERMAL SPRAY COMPOSITIONS COMPOSING AT LEAST TWO THERMOPLASTICS

(75) Inventors: Frank N. Longo, East Northport, NY (US); Thomas Gardega, Conway, SC (US)

(73) Assignee: Xiom Corporation, West Babylon, NY (US)

( * ) Notice: Subject to any disclaimer, the term of this patent is extended or adjusted under 35 U.S.C. 154(b) by 736 days.

(21) Appl. No.: 11/657,796

(22) Filed: Jan. 25, 2007

(65) Prior Publication Data

US 2007/0173590 A1    Jul. 26, 2007

Related U.S. Application Data

(60) Provisional application No. 60/762,982, filed on Jan. 26, 2006.

(51) Int. Cl.
*C08K 3/08*      (2006.01)
(52) U.S. Cl. .................. 524/439; 524/440; 524/441; 524/442; 524/500
(58) Field of Classification Search .......... 524/500, 524/439, 440, 441, 442
See application file for complete search history.

(56) References Cited

U.S. PATENT DOCUMENTS

| 5,106,910 | A | 4/1992 | Weidman et al. |
| 6,376,093 | B1 * | 4/2002 | Fujita et al. ............. 428/474.4 |
| 2003/0113566 | A1 | 6/2003 | Clemens et al. |
| 2005/0048218 | A1 | 3/2005 | Weidman |
| 2005/0075411 | A1 | 4/2005 | Wenning et al. |

FOREIGN PATENT DOCUMENTS

| BE | 633 686 | 7/1963 |
| DE | 1293368 | 4/1969 |
| EP | 0412888 | 2/1991 |
| EP | 661 954 | 10/2007 |
| JP | 55-66969 | 5/1980 |
| JP | 2002-146263 | 5/2002 |

OTHER PUBLICATIONS

Y. Bao et al: Influence of composition and process parameters on the thermal spray deposition of UHMWPE coatings:; Journal of Materials Science, Kluwer Academic Publishers, Bo, vol. 40, No. 1, Jan. 1, 2005, p. 77-85, XP019210300 ISSN: 1573-4803 the whole document.

International Search Report Form PCT/ISA/210 with Form PCT/ISA/220 and Written Opinion of International Search Authority.

* cited by examiner

*Primary Examiner*—Edward J Cain
(74) *Attorney, Agent, or Firm*—Dilworth & Barrese LLP

(57) ABSTRACT

A thermal spray coating composition comprising up to about 90 weight percent of the composition of a first thermoplastic material and up to about 50 weight percent of the composition of at least one additional thermoplastic material that is different from the first thermoplastic material. Additional components can be added to the empirical compositions in order to best additional secondary properties.

8 Claims, No Drawings

POWDER THERMAL SPRAY COMPOSITIONS COMPOSING AT LEAST TWO THERMOPLASTICS

CROSS-REFERENCE TO RELATED APPLICATIONS

This application claims priority to U.S. Provisional Application Ser. No. 60/762,982 filed Jan. 26, 2006, which is herein incorporated by reference.

FIELD OF THE INVENTION

The present invention is directed to thermal spray compositions, and particularly to powder thermal spray compositions comprising at least two thermoplastics that can be applied to either clean uncoated surfaces or coated surfaces.

BACKGROUND TO THE INVENTION

Thermal spray compositions come in powder form and can be applied to a surface by thermal spraying. The term "thermal spraying" refers to process in which a coating material feedstock, (e.g., thermal spray composition), is heated and propelled as individual droplets or particles onto the surface of a substrate. The coating material is heated by the applicator (e.g., a thermal spray gun) by using combustible gas, plasma flame or electric hot air to heat and melt the plastic particles into droplets, which are propelled out of the spray gun by compressed gas. When the coating material particles strike the substrate to be coated they flatten, flow and melt into adjacent particles to form a continuous film. It is this film that coats the surface.

Different types of thermal spray compositions are available on the market today which can be used to coat various surfaces such as metal, paper, wood, plastic, concrete and the like. These thermal spray compositions include compositions comprising thermoplastic powders. Although thermoplastic powders can be thermal sprayed into a coating, each thermoplastic powder presents special problems once applied, making these coatings limited and unreliable. For example, some thermoplastics when sprayed produce coatings that peel, crack, and pull back at the edges or even clump upon application. Therefore, what is needed in the market today are thermoplastic compositions that can be thermal sprayed using specialized equipment and once applied produce a coating that adheres to the surface, does not crack, peel or exhibit edge pull back and edge lifting.

After considerable experimental testing, it has been determined that inherent problems associated with thermal sprayed thermoplastic coatings are resolved by adding another type/species of thermoplastics. In other words, thermal spraying a composition combining at least two specific but different types and/or species of thermoplastics produce coatings free of the problems discussed above that are associated with coatings resulting from thermally spraying thermoplastics individually. The compositions of the present invention comprising at least two thermoplastics have the aforementioned characteristics as well as others and overcome the shortcomings of the prior art discussed above. The present invention is further described in the sections below.

SUMMARY OF THE INVENTION

The present invention relates to powdered thermal spray compositions comprising up to about 90 weight percent of the composition of a first thermoplastic material and up to about 50 weight percent of the composition of at least one additional thermoplastic material that is different from the first thermoplastic material. The second thermoplastic component of the composition of the present invention can either be structurally different or be processed in a particular manner that provides a thermoplastic compound that is different than the same thermoplastic not processed as the second. It is the combination of at least two different thermoplastic materials that provides a powdered thermal spray composition that when thermal sprayed produces a coating that has better physical properties than if the each of the thermoplastic materials were thermal sprayed independently. In other words, the combination of at least two different thermoplastic materials produces a powdered thermal spray composition wherein the different thermoplastic materials synergistically interact to produce a composition that when thermal sprayed produces a coating having unexpectedly favorable characteristics.

One embodiment of the present invention provides a powdered thermal spray composition comprising a first thermoplastic material that is selected from a group consisting of Polyolefins, Vinyls, Polyamides, Polyesters, polyester alloys, Nylons, and Poly (Vinylidene fluoride), polyether amides, poly ether ester Ketones (PEEK) and polyurethanes and at least one additional thermoplastic material that is selected from the group consisting of Polyolefins, Vinyls, Polyamides, Polyesters, polyester alloys, Nylons, and Poly (Vinylidene fluoride), polyether amides, poly ether ester Ketones (PEEK) and polyurethanes and is different from the first thermoplastic material.

The thermal spray composition of the present invention may also comprise at least one fluropolymer selected from the group consisting of polytetrafluoroethylene (PTFE), fluorinated ethylene propylene resin (FEP), perfluoroalkoxy copolymer resin (PFA), tetrafluroethylene-ethylene copolymer (ETFE), poly(vinylidene fluoride) (PVDF) as well as a mixture thereof. Adding the fluorpolymer to the thermal composition of the present invention provides for lubricity properties that can produce surfaces that resist the adhesion of ink so as to produce an anti-graffiti coating.

The thermal spray compositions of the present invention may also comprise at least one additive selected from the group consisting of copper oxide, copper pigment, anti-microbial compound, color control particles, wear resistant particles, phosphorescent particles, lubricity particles, anti-slip particles, metal carbides, vermiculite, neat metals, carbon fibers, crystalline particles, cellulose, fiberglass and mixtures thereof.

The above-identified additives once added to the thermal spray compositions of the present invention provide additional secondary properties and do not negate the unexpected synergistic effects of the combination of at least two thermoplastic materials discussed above. The compositions of the present invention will be discussed in greater detail in the detailed description section immediately below.

DETAILED DESCRIPTION OF THE INVENTION

The present invention provides powdered thermal spray compositions comprising at least two different thermoplastic materials that once thermal sprayed onto a surface produces a coating that adheres to a surface better than when each of the thermoplastic materials are thermally sprayed individually. In addition, the coating that results from spraying the thermal spray compositions of the present invention resists cracking, peeling and edge pull back as well as edge lifting to a higher degree than as compared to a coating produced by applying each of the same thermoplastic materials independently.

One thermal spray composition of the present invention comprises up to about 90 percent by weight of the composition of a first thermoplastic material and up to about 50 percent by weight of the composition of at least one additional thermoplastic material that is different from the first thermoplastic material. The first thermoplastic composition of the present invention may be selected from a group consisting of Polyolefins, Vinyls, Polyamides, Polyesters, polyester alloys, Nylons, and Poly (Vinylidene fluoride). The composition of the present invention comprises at least one additional thermoplastic material that may be selected from this same group but must be different from the first thermoplastic material used.

It has been found that thermal spraying a composition comprising two or more thermoplastic materials as a mechanical blend rather than thermal spraying each of the thermoplastics independently produces excellent coatings. Coatings produced by thermal spraying the compositions of the present invention possess superior physical properties as compared to coatings produced from thermal spraying each of the thermoplastic components of the composition of the invention independently. Many of the thermoplastic powders used to produce the composition of the present invention can be thermal sprayed into a coating but each material type presents special problems making practical on site application and use of these coatings limited and unreliable. After considerable experimental testing it has been determined that many of the inherent problems associated with particular families/species of thermoplastics could be resolved by adding another types/species of thermoplastics. In other words, the combination of at least two different types of thermoplastics can overcome the problems associated with using each thermoplastic alone.

For instance, a composition of the present invention comprising equal parts of polyethylene and ethylene acrylic acid (EAA, an acid modified polyolefin), when thermal sprayed, results in a coating having unexpected properties that are not associated with the individual thermoplastics when applied alone. The enhanced properties include but is not limited to better bonding, thickness capability, flexibility and non-technique dependence (See Table 1 for data on a TS blend of equal parts).

Comparably, thermal spraying polyethylene alone produces a coating that is rough with an orange peel appearance. The coating is also prone to catastrophic failure due to cracking and peeling. Thermally spraying ethylene acrylic acid (EAA) produces a smooth coating with good adhesion but, lacks hardness and wear resistance. However, as seen in Table 1, blending polyethylene and ethylene acrylic acid (EAA) into a composition of the present invention yields a fully functional coating with great utility.

The present invention is also directed to compositions comprising Nylon, preferably Nylon-11 and at least one co-polyamide, (preferably a composition comprising Nylon-6, Nylon-66 and Nylon-12 referred to as Platamid® available from Atofina Chemicals, Inc., New Jersey) that results in a thermal sprayed coating having vastly improved properties over coatings resulting from either of the two components being thermal sprayed alone. In particular, the present invention provides a composition comprising about 1% to about 67% by weight of the composition of Nylon and about 33% by weight of the composition of a co-polyamide. Nylons that can be used to make the composition of the present invention include but are not limited to Nylon-6, Nylon-66, Nylon-12, or Nylon-11, and Nylon-11 being preferred. This composition adheres to most substrates without primers and exhibits little to no edge pull back, a problem known to be associated with the individual thermoplastic materials. In addition, thermal spraying Nylon alone is extremely difficult since primers must be used and the Nylon must be pre-heated to about 400° F. in order to get it to melt. In contrast, the Nylon/co-polyamide composition of the present invention can be thermal sprayed on most surfaces without the use of primers, pre-heating of the Nylon is not necessary, and the resulting coating exhibits little to no edge pull back.

Manipulating the amount of each of the components of the compositions of the present invention in addition to the specific types of thermoplastic materials used has also produced unique and superior thermal spray compositions. For example, a composition comprising about 10% to about 60% by weight of the composition of polyethylene and about 10% to about 60% by weight of the composition of ethylene acrylic acid (EAA) provides a composition that when thermal sprayed produces a general-purpose thick coating. This general-purpose thick coating is especially useful in electrical resistivity and as a base coating with additives for special properties.

Another powdered thermal spray composition of the present invention comprises about 10% by weight to about 85% by weight of the composition of either a metal alloy or a ceramic alloy, about 3% by weight of the composition of a fluoropolymer, about 6% by weight of the composition of ethylene acrylic acid (EAA), and up to about 6% by weight of the composition of polyethylene. This thermal spray composition when thermal sprayed produces a coating having enhanced traction (grip), wear and non-stick properties not normally associated with the individual thermoplastic components when applied alone. The metal alloy used in this composition includes but is not limited to nickel alloy, aluminum oxide alloy or mixtures thereof. The amount of nickel alloy and/or aluminum oxide alloy used depends on the wear resistance needed. Other wear resistance and/or lubricity additives can be used instead of nickel alloy and/or aluminum oxide alloy including but not limited to other metal oxides, vermiculite, carbon fibers, crystalline particles, cellulose, fiberglass and neat metals such as chrome. These additives can be used in various particle sizes and concentrations. Although some of these additives provide wear resistance and can be added in place of the nickel alloy and/or aluminum oxide alloy, most can be added in addition to the nickel alloy and/or aluminum oxide alloy decreasing the amount of nickel alloy necessary in the composition and provides additional properties not otherwise realized when nickel alloy and/or aluminum oxide alloy is used alone.

The fluoropolymer containing compositions of the present invention can include fluoropolymers selected from the group consisting essentially of: (PTFE) polytetrafluoroethylene, FEP (fluorinated ethylene propylene resin), PFA (perfluoroalkoxy copolymer resin) or tetrafluoroethylene-Ethylene copolymer available from Dupont as ETFE. These fluoropolymers can be added in amounts ranging from about 1% to about 30% by weight, with the remainder of the final composition comprising a hybrid powder matrix containing at least two thermoplastics ranging from about 1% to about 30% by weight of the composition.

Another thermoplastic composition of the present invention comprises up to about 50% by weight of the composition of EAA, up to about 50% by weight of the composition of Poly(vinylidene fluoride)—PVDF and about 1 to about 15% by weight of the composition of fluoropolymer particles in order to enhance surface release. This composition can be used for long-term weatherability as well as an anti-graffiti coatings.

Still another thermoplastic composition of the present invention comprises a blend of Polyethylene and EAA with about 1% to about 5% by weight of the composition of an anti-microbial powder added for bacteria resistance. Anti-microbial powders that can be used in the compositions of the present invention include but are not limited silver ion powder, triclosane, capsasin and mixtures thereof.

Still another thermoplastic composition of the present invention comprises a blend of polyethylene and polyether amide, preferably Pebax®. Pebax® polyether block amides are plasticizer-free thermoplastic elastomers belonging to the engineering polymer family. Pebax® can be easily melt blended with other polymers. Their unique chemistry (polyether block amide—PEBA) allows Pebax® to achieve a wide range of physical and mechanical properties by varying the monomeric block types and ratios. The Pebax® product range extends from grades with properties of polyamide to grades with properties more like elastomers. The remarkable processing performance of Pebax® makes them an ideal material for components requiring: light weight; great flexibility (extensive range); resiliency; very good dynamic properties due to low hysteresis (alternative flexure); high strength; outstanding properties at low temperature (impact resistance, low rigification); easy processing; good resistance to most chemicals; ability to be impregnated with fragrances; outstanding impact resistance at low temperatures.

The resulting coatings containing Pebax® have properties not exhibited by each of the individual ingredients when applied as a thermal sprayed coating independently. For example, although Pebax® has a good flexibility when applied alone, it does not exhibit good wear resistance. However, the composition comprising Pebax® and polyether and/or EAA when thermal sprayed produces a coating having the flexibility of Pebax® and the wear resistance of polyether and/or EAA. In addition the coating produced from this composition can withstand temperatures as low as −50° C. and as high as 50° C.

Another composition of the present invention is produced by combining Pebax® and Nylon, preferably Nylon-11. This too provides a composition that when thermal sprayed produces a coating that is more flexible than Pebax® and more wear resistant than Nylon. In other words, the composition produces coatings having properties not exhibited by coatings produced from the individual ingredients alone.

Still yet another thermoplastic composition of the present invention comprises a composite of polyethylene, copper pigment/copper metal, PTFE, and Agion bound together with ethylene glycol which is then blended with polyether co-polyamide such as Pebax®. This composition, once thermal sprayed, produces a thermal sprayed coating that provides anti-fouling properties. Copper pigment/copper metal is one additive that can provide anti-fouling properties to the above described composition, but it is within the scope of the invention to include other ant-fouling agents such as capsasin in the compositions designed for producing thermal sprayed surfaces exhibit ant-fouling characteristics.

It is fully anticipated within the scope of the disclosure that many different additives, some described above, can be added to the base thermal spray compositions of the present invention comprising at least two thermoplastic materials to produce unique thermal spray compositions that have enhanced properties over thermal sprays comprising only one of the thermoplastic materials. The additives used include but are not limited to the ones described in this disclosure as well as other additives that are used in the art of thermal spraying. Additives that are developed subsequent to this disclosure can also be added to the thermal spray compositions of the present invention since the inventive aspect of the invention is the addition of at least two thermoplastic compounds which when used alone have inferior properties then when combined. The additives are used to bestow additional properties to the thermal spray compositions of the present invention when applied. These properties can include antibacterial properties, odor control, glow-in-the dark properties, increased lubricity, increased wear resistance, increased or decrease grip, all of which are secondary to the main purpose of the thermal spray composition.

For example, vermiculite can be added to a two-component thermoplastic thermal spray composition in order to increase lubricity of the composition. One use for this composition can be the application of the composition to the sidewalls of SUV tires so as to allow the tires to roll instead of grip the road when deformed so as to prevent rollovers. Additional functions can also be found for compositions containing vermiculite, as well as all of the compositions described herein and are part of the present disclosure.

The powdered spray compositions of the present invention can be produced by simply blending the powder ingredients in a large mixing machine and mixing the ingredients until the components of the compositions are equally distributed. The composition of the present invention may also be manufactured using a binder and/or by heat softening the components so as to attach particles added to the heat-softened component to form a composite. In this procedure, the thermoplastic particles become wet with the binder and/or softened (tacky) by heat and at least one of the other components listed in the disclosure above is attached or clad to the wet and/or heat softened thermoplastic particles. The other components added to the wet thermoplastic particles actually stick to each other and form particles clad with other components. The particles must be partially clad, which is controlled by adding an excess of one thermoplastic material by volume to other components added to produce the composition. In the alternative, additives can be dissolved in an easily vaporizable solvent, i.e. alcohol or water, and sprayed on the solid materials of the composition so that after complete evaporation of the solvent, the additive is evenly dispersed throughout the composition.

Conventional stirring mixtures used in polymer chemistry can be used for this mixing process. Typically, the size of one type of thermoplastic particle used in the composition is greater than the size of the second type of thermoplastic particle used in the composition. Typical sizes range from about 10 μm to about 300 μm, preferably from about 44 μm to about 150 μm or larger. The finer components of the composition, like pigments, typically are from about 1 μm or less to about 30 μm in size. In the case where the additives is in the form of a fiber, i.e. fiberglass, the fibers can have a diameter of up to about 5 μm and a length of up to about 300 μm. The size of the particles in the final composition can be controlled by passing the final powder composition through a mesh having the desired particle diameter size.

TABLE 1

PHYSICAL PROPERTIES OF A THERMAL SPRAYED COATING COMPRISING
AN EQUAL PARTS BLEND OF POLYETHYLENE AND EAA.

| Coating Properties | Testing Method | Results |
|---|---|---|
| Specific Gravity | Calculated | 1.15-1.49 g/cc |
| Adhesion Tape Test | ASTM D 3359 | 5A on a scale from 0A to 5A |
| Tensile Strength | ASTM D 4541 | Exceeds 1508 psi. Epoxy glue broke before adhesive disbond. |
| Hardness (Shore D) | ASTM D 3383 | Pencil hardness 3B |
| Impact Resistance (Direct) | ASTM D 2794 | 160 inch pounds. No cracking. |
| Flexibility Mandrel | ASTM D522 | A 0.015-inch thick coating exceeded the upper limit for flexibility for this test. NO cracks, no loss of bond. Elongation 53%. |
| Tabor Abrasion Resistance | ASTM D4060 | 39.8 mg loss, 1000 cycles, 1000 gm load |
| QUVA | ASTM B7 | 1000 + hrs. Still running. Excellent gloss and color retention. |
| Salt Spray (Fog) Resistance | ASTM B117 | After 1000 + hrs. No degradation and no lifting. Still running. |
| Humidity Resistance | ASTM B7 | Condensation during off cycle has no effect after 1000 + hrs. |
| Melt Point and Service Temperature | | 220 F. (104.5 C.). Continuous service temperature not to exceed 180 F. (82.2). |
| Flammability | FMVSS 302 09-98 | DNI. Does not support combustion during or after ignition. |
| Dielectric | IEC-243-VDE-0303 | Gap 1.21 V/mil/15 mils |
| Volume Resistivity | IEC-93 | $8 \times 10^{17}$ ohms |
| Surface Resistivity | IEC-93 | $8 \times 10^{17}$ ohms |

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A powdered thermal spray composition comprising:
    about 10% by weight to about 85% by weight of the composition of a metal alloy or ceramic alloy;
    about 3% by weight of the composition of a fluoropolymer;
    about 6% by weight of the composition of ethylene acrylic acid (EAA); and
    about 6% by weight of the composition of polyethylene.

2. The thermal spray composition according to claim 1 further comprising at least one additional thermoplastic material is selected from the group consisting of Polyolefins, Vinyls, Polyamides, Polyesters, polyester alloys, Nylons, and Poly (Vinylidene fluoride), polyether amides, poly ether ester Ketones (PEEK) and polyurethanes and is different from said first thermoplastic material.

3. The thermal spray composition according to claim 1 wherein said fluropolymer is selected from the group consisting of polytetrafluoroethylene (PTFE), fluorinated ethylene propylene resin (FEP), perfluoroalkoxy copolymer resin (PFA), tetrafluroethylene-ethylene copolymer (ETFE), poly (vinylidene fluoride)(PVDF) and mixtures thereof.

4. The thermal spray composition according to claim 1 wherein the metal alloy is nickel alloy or aluminum oxide.

5. The thermal spray composition according to claim 1 further comprising metal oxides, wear resistant particles, lubricity additives, carbides, vermiculite, neat metals, carbon fibers, crystalline particles, cellulose, fiberglass and mixtures thereof.

6. A thermoplastic composition comprising:
    about 10% by weight to about 85% by weight of the composition of a metal alloy or ceramic alloy;
    about 3% by weight of the composition of a fluoropolymer;
    about 6% by weight of the composition of ethylene acrylic acid (EAA); and
    about 6% by weight of the composition of polyethylene; and
    at least one additive selected from the group consisting of copper oxide, copper pigment, anti-microbial compound, color control particles, wear resistant particles, phosphorescent particles, lubricity particles, anti-slip particles, vermiculite, neat metals, carbon fibers, crystalline particles, cellulose, fiberglass and mixtures thereof.

7. The powdered thermal spray composition of claim 6 wherein the anti-microbial compound is selected from the group consisting of silver ion powder, triclosan, capsasin and mixtures thereof.

8. The thermal spray composition of claim 6 further comprising up to 20% by weight of the composition of fiberglass.

* * * * *